(12) United States Patent
Kuo et al.

(10) Patent No.: US 9,594,233 B2
(45) Date of Patent: Mar. 14, 2017

(54) ZOOM LENS

(71) Applicant: Coretronic Corporation, Hsin-Chu (TW)

(72) Inventors: Tao-Hung Kuo, Hsin-Chu (TW); Tzu-Yuan Lin, Hsin-Chu (TW); Ching-Chuan Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 74 days.

(21) Appl. No.: 14/864,900

(22) Filed: Sep. 25, 2015

(65) Prior Publication Data

US 2016/0170187 A1    Jun. 16, 2016

(30) Foreign Application Priority Data

Dec. 16, 2014    (TW) .............................. 103143845 A

(51) Int. Cl.
  *G02B 15/14*    (2006.01)
  *G02B 15/16*    (2006.01)
  *G02B 15/177*   (2006.01)
  *G02B 27/00*    (2006.01)

(52) U.S. Cl.
  CPC ......... *G02B 15/161* (2013.01); *G02B 15/177* (2013.01); *G02B 27/0025* (2013.01)

(58) Field of Classification Search
  CPC ...... G02B 13/009; G02B 15/14; G02B 15/16; G02B 15/161; G02B 15/177; G02B 15/20
  USPC .......................................... 359/676, 683, 691
  See application file for complete search history.

(56) References Cited

U.S. PATENT DOCUMENTS

2012/0182626 A1* 7/2012 Liu ...................... G02B 15/177
                                                         359/682

FOREIGN PATENT DOCUMENTS

| CN | 101726833  | 6/2010  |
| CN | 102016685  | 4/2011  |
| CN | 102207607  | 10/2011 |
| JP | 2012150452 | 8/2012  |
| TW | 201307890  | 2/2013  |

OTHER PUBLICATIONS

"Office Action of Taiwan Counterpart Application", issued on Aug. 4, 2015, p. 1-p. 5.

* cited by examiner

*Primary Examiner* — William Choi
(74) *Attorney, Agent, or Firm* — Jianq Chyun IP Office

(57) ABSTRACT

A zoom lens including a first lens group and a second lens group is provided. The first lens group having a negative refractive power is disposed between an object side and an image side and includes a first lens having a negative refractive power. The second lens group having a positive refractive power is disposed between the first lens group and the image side and includes a second lens, a third lens, a fourth lens and a fifth lens arranged in sequence from the object side to the image side. Refractive powers of the second lens, the third lens, the fourth lens and the fifth lens are positive, positive, negative and positive in sequence, wherein the first lens has a surface facing the object side, a radius of curvature of the surface is R1, and |R1|>700 mm.

14 Claims, 5 Drawing Sheets

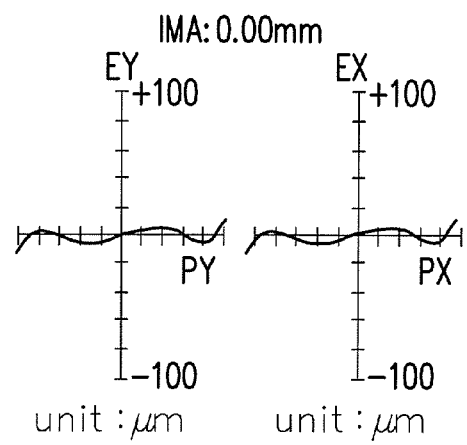
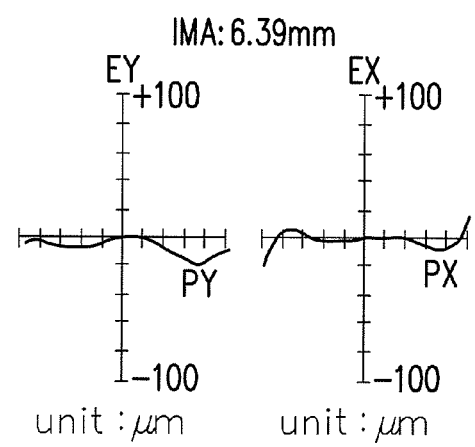
FIG. 3A  FIG. 3B
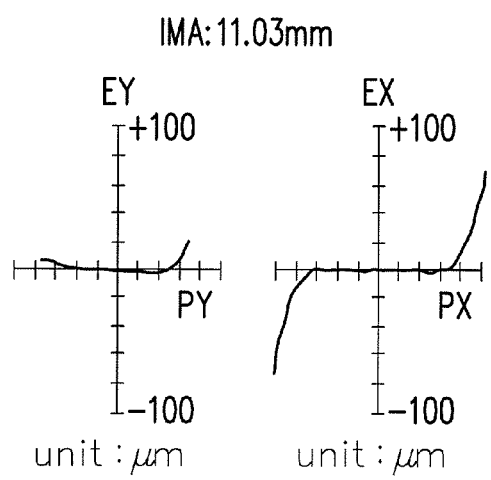
FIG. 3C

ZOOM LENS

CROSS-REFERENCE TO RELATED APPLICATION

This application claims the priority benefit of Taiwan application serial no. 103143845, filed on Dec. 16, 2014. The entirety of the above-mentioned patent application is hereby incorporated by reference herein and made a part of this specification.

BACKGROUND OF THE DISCLOSURE

1. Field of the Disclosure

The disclosure generally relates to a lens. More particularly, the disclosure relates to a zoom lens.

2. Description of Related Art

Along with development of optoelectronic technology, image apparatuses such as projectors, digital video cameras (DVC), digital cameras (DC) and the like have been extensively used in our daily life. The zoom lens is one of the core devices of the image apparatuses. By adjusting the zoom lens, an image may be clearly focused on a screen or a charge coupled device (CCD) for forming the image. Thus, the imaging quality and the optical quality of the zoom lens are closely related. With drastic competitions in the market, all manufacturers focus on improving the optical quality of the zoom lens and reducing weight, volume and manufacturing cost thereof, so as to improve the competition of the image apparatus at an advantageous position.

In the conventional technology, in order to achieve advantages of better imaging quality and compactness, in general, the zoom lens is configured as composed of two lens groups, wherein the first lens group located near the object side has a negative refractive power, and the second lens group located near the image side has a positive refractive power, namely, the first lens group is used for diverging light beams while the second lens group is used for converging light beams. In the first lens group, the surface facing the object side may be exposed outside the zoom lens or outside a cover body of an image apparatus, thus if the surface facing the object side is a convex surface or a concave surface, resulting that dust may easily accumulate on the surface and the brightness and clearness of the image formed by the image apparatus may be affected. In addition, if the surface facing the object side is a convex surface whose spherical center is at the image side, the light beam transmitted to the surface is easily be reflected back to the image processing unit which is located at the image side, and the light beam which is reflected back to the image processing unit is easily to be projected onto the screen and generates cross-talk which affects the imaging quality.

The information disclosed in the "Description of Related Art" section is only for enhancement of understanding of the background of the described technology, and therefore it may contain information that does not form the prior art that is already known to a person of ordinary skill in the art. Further, the information disclosed in the "Description of Related Art" section does not mean that one or more problems to be resolved by one or more embodiments of the invention was acknowledged by a person of ordinary skill in the art.

SUMMARY OF THE DISCLOSURE

The disclosure provides a zoom lens, in which problems of dust accumulating and cross-talk are improved.

Other objects and advantages of the disclosure can be further illustrated by the technical features broadly embodied and described as follows.

In order to achieve one or a part of or all of the above advantages or other advantages, an embodiment of the disclosure provides a zoom lens, which includes a first lens group and a second lens group. The first lens group having a negative refractive power is disposed between an object side and an image side, and includes a first lens having a negative refractive power. A second lens group having a positive refractive power is disposed between the first lens group and the image side and includes a second lens, a third lens, a fourth lens and a fifth lens arranged sequentially from the object side to the image side. Refractive powers of the second lens, the third lens, the fourth lens and the fifth lens are sequentially positive, positive, negative and positive, wherein the first lens has a surface facing the object side, and the radius of curvature of the surface facing the object side is R1, and |R1|>700 mm According to an exemplary embodiment of the disclosure, the radius of curvature of the surface facing the object side of the first lens of the zoom lens R1 satisfies: |R1|>1000 mm.

According to an exemplary embodiment of the disclosure, the surface facing the object side of the first lens is a plane, and |R1|=∞.

According to an exemplary embodiment of the disclosure, the first lens has a surface facing the second lens group, a radius of curvature of the surface facing the second lens group is R2, and 35<|R1/R2|<∞.

According to an exemplary embodiment of the disclosure, a focal length of the first lens group is F1, a focal length of the second lens group is F2, and 1.65<|F1/F2|<1.85.

According to an exemplary embodiment of the disclosure, an Abbe number of the first lens is $Vd_{L1}$, a focal length of the first lens group is F1, a focal length of the zoom lens is F, and the zoom lens satisfies the following equation: $1.2<|Vd_{L1}/F1|<1.5$, and $2<|F1/F|<2.25$.

According to an exemplary embodiment of the disclosure, the zoom lens further includes an aperture stop disposed between the third lens and the fourth lens of the second lens group, or disposed between the fourth lens and the fifth lens of the second lens group.

According to an exemplary embodiment of the disclosure, the fourth lens has a surface facing the third lens, a radius of curvature of the surface facing the third lens is R3, the fourth lens has a surface facing the fifth lens, a radius of curvature of the surface facing the fifth lens is R4, a refractive index of the fourth lens is $N_{L4}$, and the fourth lens satisfies the following equation: $4<|(R3/R4)*N_{L4}|<5.1$.

According to an exemplary embodiment of the disclosure, an average refractive index of the second lens group is larger than 1.65.

According to an exemplary embodiment of the disclosure, each of the first lens, the second lens, the third lens, the fourth lens and the fifth lens is a spherical lens.

According to an exemplary embodiment of the disclosure, the first lens group and the second lens group are adapted to move between the object side and the image side, so that the zoom lens is switched between a wide-end and a tele-end.

According to an exemplary embodiment of the disclosure, when the first lens group and the second lens group move away from each other, the zoom lens is switched from the tele-end to the wide-end.

According to an exemplary embodiment of the disclosure, when the first lens group and the second lens group move toward each other, the zoom lens is switched from the wide-end to the tele-end.

According to an exemplary embodiment of the disclosure, the second lens is a biconvex lens, the third lens is a convex-concave lens with a convex surface facing the second lens, the fourth lens is a biconcave lens and the fifth lens is a biconvex lens.

In light of the above, in the abovementioned embodiments of the disclosure, the zoom lens is configured as the surface near the object side is a plane or substantial plane, so as to prevent dust accumulating on that surface, and reduce the possibility that the light beam transmitted to that surface is reflected back to the image processing unit. Therefore, the zoom lens of the disclosure can improve the negative impact of the dust accumulating and cross-talk to the imaging quality.

To make the above features and advantages of the disclosure more comprehensible, several embodiments accompanied with drawings are described in detail as follows.

BRIEF DESCRIPTION OF THE DRAWINGS

FIG. 3A, FIG. 3B and FIG. 3C shows transverse ray fan plots of a zoom lens according to an embodiment of the disclosure.

DESCRIPTION OF THE EMBODIMENTS

It is to be understood that the foregoing and other detailed descriptions, features, and advantages are intended to be described more comprehensively by providing embodiments accompanied with figures hereinafter. In the following embodiments, wordings used to indicate directions, such as "up", "down", "front", "back", "left", and "right", merely refer to directions in the accompanying drawings. Therefore, the directional wording is used to illustrate rather than limit the disclosure.

Figure 1A:
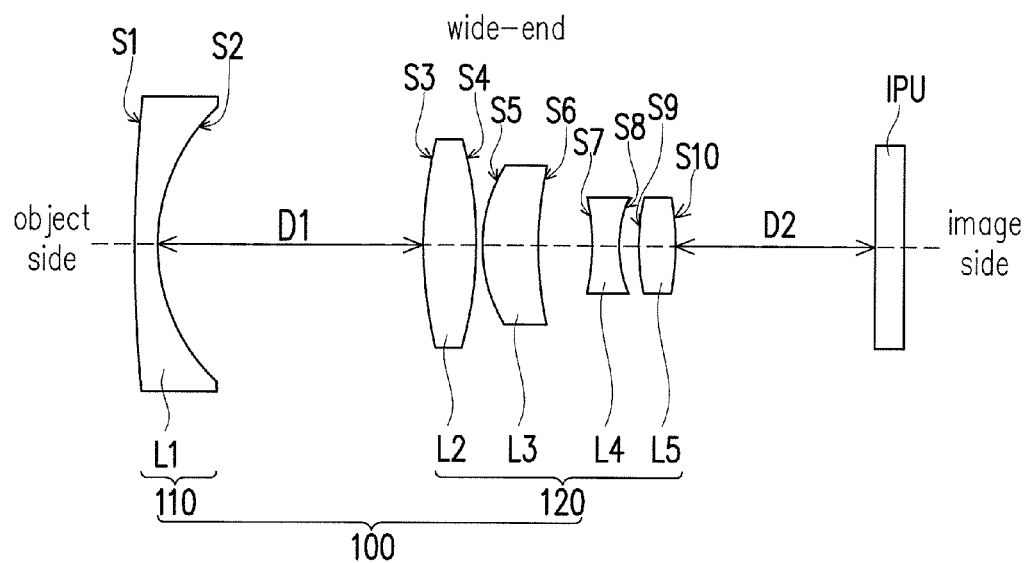
FIG. 1A and FIG. 1B are schematic views illustrating that a zoom lens is positioned at a wide-end and a tele-end according to an embodiment of the disclosure.
Figure 1B:
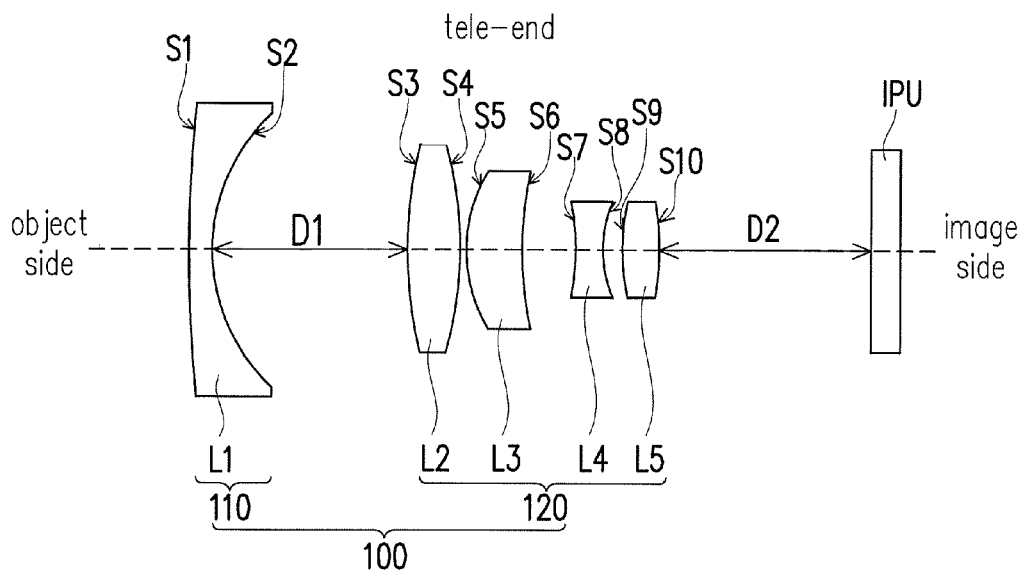

FIG. 1A and FIG. 1B are schematic views illustrating that a zoom lens is positioned at a wide-end and a tele-end according to an embodiment of the disclosure. Referring to FIG. 1A and FIG. 1B, the zoom lens 100 of the embodiment is disposed between an object side and an image side and may be used as a zoom lens of a projector, a camera, a video camera, a monitoring device, or the like. In general, an image processing unit IPU may be disposed between the zoom lens 100 and the image side. The image processing unit IPU may be a photosensitive device or a light valve, wherein the photosensitive device may be a charge coupled device (CCD) or a complementary metal-oxide semiconductor (CMOS) image sensor, and the light valve may be a display device such as a digital micro-mirror device (DMD), a liquid crystal on silicon panel (LCOS panel), or the like. For example, if the zoom lens 100 is used in an image capturing device, such as a camera, a video camera or a monitoring device, then the image processing unit IPU is the photosensitive device. If the zoom lens 100 is used in a projector, then the image processing unit IPU is the light valve.

The zoom lens 100 includes a first lens group 110 having a negative refractive power and a second lens group 120 having a positive refractive power, wherein the first lens group 110 is disposed between the object side and the image side, and the second lens 120 is disposed between the first lens group 110 and the image side. If the zoom lens 100 is used in projectors, then the object side is the projection screen side (not shown), then the image side is the image processing unit IPU (light valve) side.

The first lens group 110 has a first lens L1 which has a negative refractive power. As shown in FIG. 1A and FIG. 1B, the first lens L1 is a substantial planar concave lens for example, and the concave surface faces the image side. Specifically, the surface S1 facing the object side of the first lens L1 is the surface of the zoom lens 100 which is nearest to the object side, and generally the surface S1 of the first lens L1 is exposed outside the cover body (not shown) of the projector, camera, video camera or monitoring device, thus dust may easily stick or accumulate thereon. If dust accumulates on the surface, it may affect the brightness and clarity of the image, thereby deteriorating the image quality. In addition, if the surface is a convex surface with its spherical center located at the image side, the image quality may likely be affected because cross-talk is generated. In the embodiment, by designing the surface S1 of the first lens L1 to be a substantial plane or a plane, possibility of dust staying on the surface S1 and possibility of the light beam transmitted to the surface S1 being reflected back to the image processing unit IPU may be reduced, thereby the negative impact of the dust and cross-talk to the imaging quality is improved.

The abovementioned substantial plane design means that the radius of curvature of the surface S1 is R1, and $|R1|>700$ mm. Since the dimension of the first lens L1 is very small, when $|R1|>700$ mm, the surface S1 is approximate to a plane.

In one embodiment, if the surface S1 of the first lens L1 is a concave surface with its spherical center located at the object side, and when the absolute value of the radius of curvature of the concave surface is larger than 700 mm, the reflected light on the surface S1 is diverged outward from an optical axis (not labeled), thus the possibility of the light beam transmitted to the surface S1 being reflected back to the image processing unit IPU and further projected on the projection screen can be reduced. In one embodiment, $|R1|>1000$ mm, and the surface S1 of the first lens L1 is a substantial plane. Or, the surface S1 of the first lens L1 can also be a plane, i.e., $|R1|=\infty$. According to the abovementioned configuration, the first lens L1 has a surface S2 facing the second lens group 120, the radius of curvature of the surface S2 facing the second lens group 120 is R2, and $35<|R1/R2|<\infty$.

Through the first lens group 110 being composed of only one lens (i.e., the first lens L1), the structure and the difficulty of manufacturing process of the zoom lens 100 may be simplified, and the manufacturing cost and weight of the zoom lens 100 may be reduced. In addition, by appropriately selecting the first lens L1, for instance, the Abbe number VdL1 of the first lens L1 is set to be larger than 50, the occurrence of image aberration can be effectively reduced. In addition, the ratio of a focal length F of the zoom lens 100 to a focal length F1 of the first lens group 110 can also be restrained in order that the whole zoom lens 100 has a good zooming effect and a good imaging quality is maintained. For example, the zoom lens 100 satisfies the following equation: $1.2<|Vd_{L1}/F1|<1.5$, and $2<|F1/F|<2.25$.

The second lens group 120 includes a second lens L2, a third lens L3, a fourth lens L4 and a fifth lens L5 arranged sequentially from the object side to the image side. Refractive powers of the second lens L2, the third lens L3, the fourth lens L4 and the fifth lens L5 are sequentially positive, positive, negative and positive. Specifically, the second lens L2 is a biconvex lens, the third lens L3 is a convex-concave lens with a convex surface facing the second lens L2, the fourth lens L4 is a biconcave lens and the fifth lens L5 is a biconvex lens.

In order to ensure the imaging quality, the ratio of the focal length F1 of the first lens group 110 to a focal length F2 of the second lens group 120 can also be restrained. For example, the zoom lens 100 satisfies the following equation: $1.65<|F1/F2|<1.85$ In addition, the fourth lens L4 has a surface S7 facing the third lens L3 and a surface S8 facing the fifth lens L5, and the fourth lens L4 which has a negative refractive power in the second lens group 120 satisfies the following equation: $4<|(R3/R4)*N_{L4}|<5.1$, wherein the radius of curvature of the surface S7 of the fourth lens L4 is R3, the radius of curvature of the surface S8 of the fourth lens L4 is R4, the refractive index of the fourth lens L4 is $N_{L4}$.

In order to reduce image aberration, the material of the second lens L2 may be selected from a glass material with low dispersion coefficient, and Abbe number thereof is approximately ranged from 35 to 75. Furthermore, in order to improve spherical aberration, distortion and field curvature, the material of the fourth lens L4 may be selected from a glass material with high refractive index, and Abbe number thereof is approximately ranged from 20 to 50. The refractive index $N_{L4}$ of the fourth lens L4 is larger than 1.65. In one embodiment, the average refractive index of the four lenses in the second lens group 120 may also be larger than 1.65.

In practical operation, the first lens group 110 and the second lens group 120 are adapted to move between the object side and the image side along the optical axis (not labeled), so that the zoom lens 100 is switched between a wide-end and a tele-end. Specifically, under the condition that the distance between the projection screen and the zoom lens 100 is fixed, if the size of image is to be changed (e.g., the size of the image projected on the projection screen is to be changed), namely if the zoom ratio of the zoom lens 100 is adjusted from wide-end to tele-end, then the first lens group 110 and the second lens group 120 may move toward each other, namely the distance D1 between the first lens group 110 and the second lens group 120 is reduced, and the distance D2 between the second lens group 120 and the image processing unit IPU which is located at the image side may be increased. On the other hand, if the zoom ratio of the zoom lens 100 is adjusted from tele-end to wide-end, then the first lens group 110 and the second lens group 120 may move away from each other, namely the distance D1 between the first lens group 110 and the second lens group 120 is increased, and the distance D2 between the second lens group 120 and the image processing unit IPU which is located at the image side may be reduced. In addition, after the distance between the projection screen and the zoom lens 100 is changed, if the clarity of the image on the projection screen is to be adjusted, the distance D1 between the first lens group 110 and the second lens group 120 may be adjusted.

In the embodiment, the zoom lens 100 further includes an aperture stop (not shown) which may be disposed between the third lens L3 and the fourth lens L4 of the second lens group 120, or may be disposed between the fourth lens L4 and the fifth lens L5 of the second lens group 120. For example, the aperture stop may be disposed on a surface S6, facing the image side, of the third lens L3 or on the surface S7, facing the object side, of the fourth lens L4, but the disclosure is not limited thereto.

It should be mentioned that the zoom lens 100 of the embodiment does not need an aspheric lens which is more expensive for eliminating image aberration, thus all of the first lens L1, the second lens L2, the third lens L3, the fourth lens L4 and the fifth lens L5 may be spherical lenses which may be manufactured by simpler process, and thereby the manufacturing cost of the zoom lens 100 may be reduced.

An embodiment of the zoom lens 100 is given hereinafter with the following Table 1 and Table 2. However, the disclosure is not limited to the data listed below. It should be known to those ordinary skilled in the art that various modifications and variations can be made to the structure of the disclosure without departing from the scope or spirit of the invention.

TABLE 1

| Notes | Surface | Radius of Curvature (mm) | Distance (mm) | Refractive Index | Abbe Number |
|---|---|---|---|---|---|
| First Lens (L1) | S1 | 1168 | 1.73 | 1.516 | 64.14 |
|  | S2 | 24.9 | D1 (variable) |  |  |
| Second Lens (L2) | S3 | 50.1 | 5.99 | 1.603 | 60.64 |
|  | S4 | −50.1 | 0.92 |  |  |
| Third Lens (L3) | S5 | 17.7 | 10.18 | 1.667 | 48.33 |
|  | S6 | 92.5 | 1.13 |  |  |
| Fourth Lens (L4) | S7 | −40.9 | 2.95 | 1.785 | 25.68 |
|  | S8 | 14.6 | 1.14 |  |  |
| Fifth Lens (L5) | S9 | 99.2 | 5.7 | 1.639 | 55.38 |
|  | S10 | −17.7 | D2 (variable) |  |  |

Referring to FIG. 1A, FIG. 1B and Table 1, the surface S1 and the surface S2 are the surfaces of the first lens L1 respectively facing the object side and the image side. The surface S3 and the surface S4 are the surfaces of the second lens L2 respectively facing the object side and the image side. The surface S5 and the surface S6 are the surfaces of the third lens L3 respectively facing the object side and the image side. The surface S7 and the surface S8 are the surfaces of the fourth lens L4 respectively facing the object side and the image side. The surface S9 and the surface S10 are the surfaces of the fifth lens L5 respectively facing the object side and the image side. The distance shown in Table 1 indicates the distance between the two adjacent surfaces along the optical axis. For example, the distance which corresponds to the surface S1 indicates the distance between the surface S1 and the surface S2 along the optical axis. In such configuration, the focal length F1 of the first lens group 110 is equal to −49.087 mm, and the focal length F2 of the second lens group 120 is equal to 27.969 mm.

TABLE 2

|  | Wide-end | Tele-end |
|---|---|---|
| D1 (mm) | 38.793 | 33.214 |
| D2 (mm) | 20.042 | 21.358 |
| EFL (mm) | 21.92 | 24.064 |
| F-number | 2.413 | 2.526 |

Some important parameters of the zoom lens 100 which is positioned in the wide-end and the tele-end are listed respectively in Table 2, such as effective focal length (EFL), F-number, D1 and D2. D1 is the distance between the first lens group 110 and the second lens group 120, and D2 is the distance between the second lens group 120 and the image processing unit IPU. In the embodiment, the aperture stop is disposed on the surface S7 of the fourth lens L4. As shown in Table 2, the F-number of the zoom lens 100 is smaller than 3.5, namely the aperture of the zoom lens 100 is large and the relative aperture is large. In addition, effect of eliminating image aberration is achieved by only five spherical lenses in the embodiment. In other words, the zoom lens 100 may have the advantages of low manufacturing cost and simplified lens structure.

TABLE 3

| Surface | Wide-end (%) | Tele-end (%) |
| --- | --- | --- |
| S1 | 0.000 | 0.000 |
| S2 | 0.941 | 2.060 |
| S3 | 3.243 | 3.718 |
| S4 | 1.155 | 1.450 |
| S5 | 2.218 | 2.668 |
| S6 | 2.036 | 2.544 |
| S7 | 1.871 | 2.331 |
| S8 | 3.740 | 4.602 |
| S9 | 5.491 | 7.232 |
| S10 | 2.268 | 2.920 |

Table 3 shows the simulation results of the light density of the cross-talk of the zoom lens 100 on the projection screen. Taking the value 0.000% of the wide-end corresponding to the surface S1 as an example, which represents that the surface S1 is taken as a reflective surface, the illumination of the light beam from the image processing unit IPU of FIG. 1 after reflected back to the image processing unit IPU by the reflective surface (i.e., surface S1) and projected onto the projection screen is 0, namely the luminous flux received by a unit area is 0. According to the simulation results shown in Table 3, with respect to both wide-end and tele-end, the cross-talk on the projection screen that the surface S1 contributes to the projection screen is 0. In other words, the surface S1 of the zoom lens 100 facing the object side (i.e., the projection screen side) is designed to be a plane or a substantial plane, thereby it facilitates reducing the possibility of the light beam transmitted to the surface S1 being reflected back to the image processing unit (IPU) and further projected back onto the projection screen.

Figure 2A:
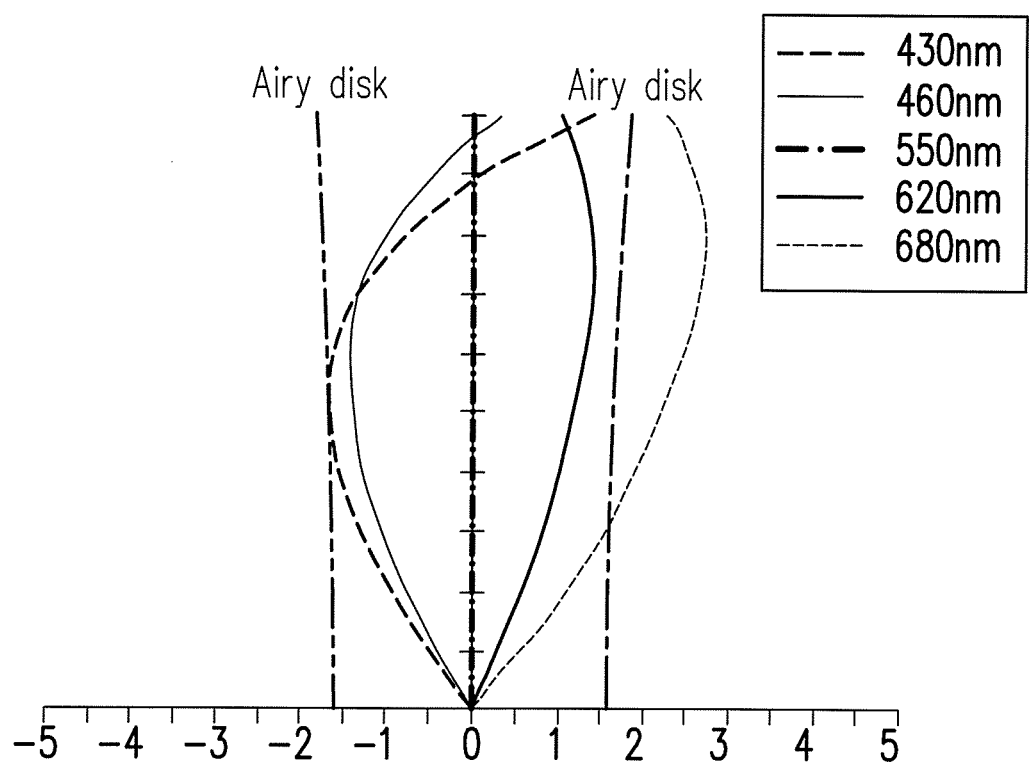
FIG. 2A, FIG. 2B and FIG. 2C respectively shows lateral color, field curvature and distortion of a zoom lens according to an embodiment of the disclosure.
Figure 2B:
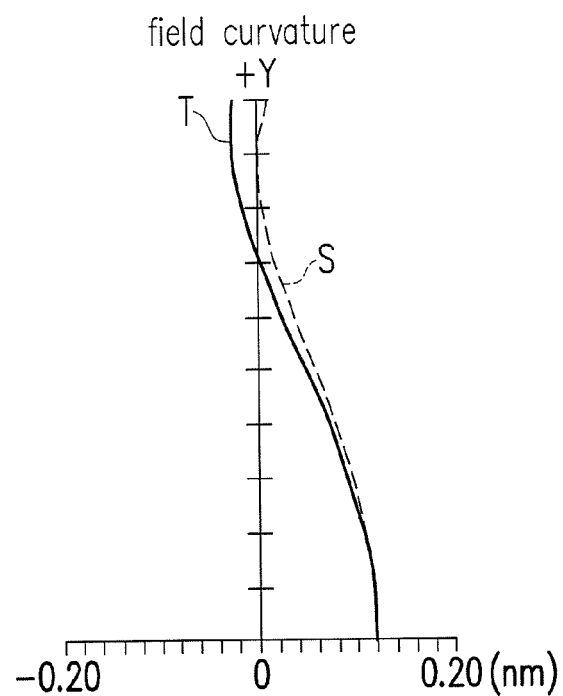
Figure 2C:
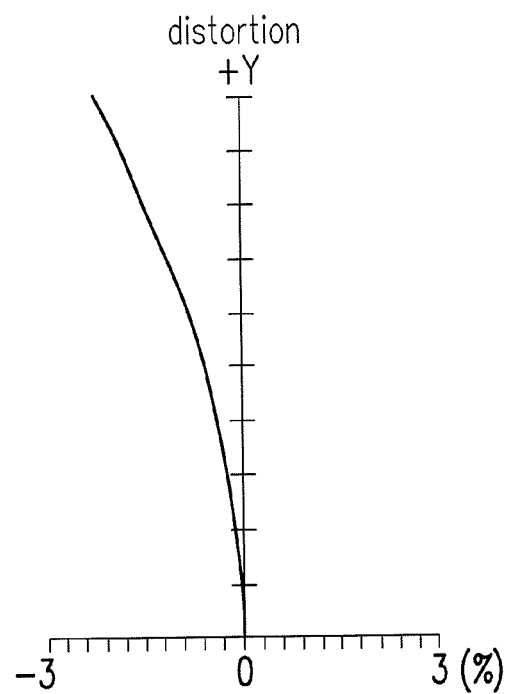
Figure 4A:
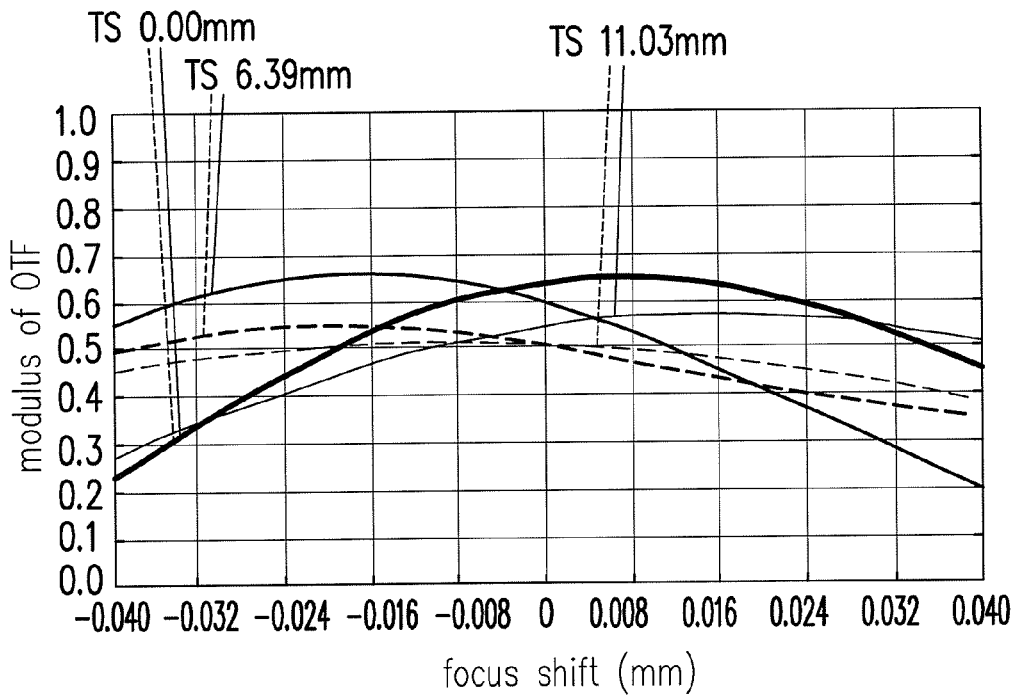
FIG. 4A and FIG. 4B are curve diagrams illustrating modulation transfer function (MTF) of a zoom lens positioned at a wide-end and a tele-end respectively according to an embodiment of the disclosure.
Figure 4B:
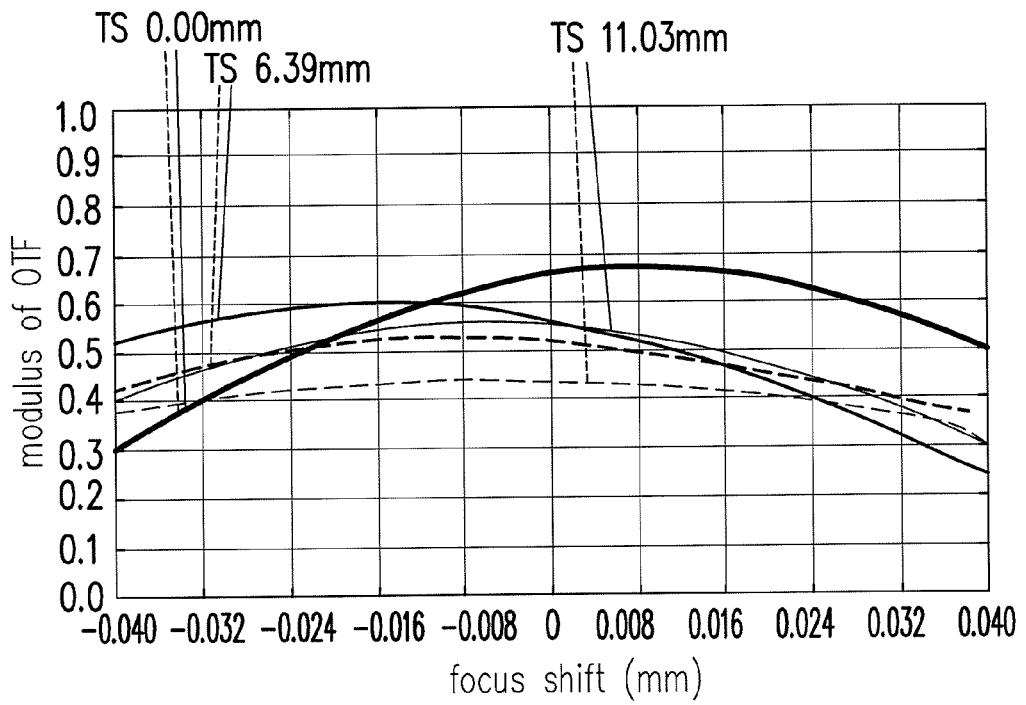

FIG. 2A, FIG. 2B and FIG. 2C respectively shows lateral color, field curvature and distortion of a zoom lens according to an embodiment of the disclosure, wherein FIG. 2A shows the simulation data diagram obtained with light having wavelengths of 430 nm, 460 nm, 550 nm, 620 nm and 680 nm. In FIG. 2B, the curve S is data in a sagittal direction, and the curve T is data in a tangential direction. FIG. 3A, FIG. 3B and FIG. 3C shows transverse ray fan plots of a zoom lens according to an embodiment of the disclosure, wherein the horizontal axis shows positions where the light beam passes through the aperture stop, and the vertical axis shows positions where the light beam is transmitted to the image plane. FIG. 4A and FIG. 4B are curve diagrams illustrating modulation transfer function (MTF) of a zoom lens positioned at a wide-end and a tele-end respectively according to an embodiment of the disclosure, wherein the horizontal axis shows the focus shift, and the vertical axis shows the modulus of the optical transfer function (modulus of the OTF). Referring to FIG. 2A through FIG. 4B, it can be noted that all of the figures such as lateral color, field curvature, distortion, transverse ray fan plots, MTF curve and the like are in a standard range, thus the zoom lens 100 of the disclosure has a superior imaging quality.

Another embodiment of the zoom lens 100 is given hereinafter with the following Table 4 and Table 5. However, the disclosure is not limited to the data listed below. It should be known to those ordinary skilled in the art that various modifications and variations can be made to the structure of the disclosure without departing from the scope or spirit of the invention.

TABLE 4

| Notes | Surface | Radius of Curvature (mm) | Distance (mm) | Refractive Index | Abbe Number |
| --- | --- | --- | --- | --- | --- |
| First Lens (L1) | S1 | ∞ | 1.8 | 1.516 | 64.14 |
|  | S2 | 24.9 | D1 (variable) |  |  |
| Second Lens (L2) | S3 | 50.1 | 4.8 | 1.603 | 60.64 |
|  | S4 | −50.1 | 0.93 |  |  |
| Third Lens (L3) | S5 | 17.7 | 10.18 | 1.667 | 48.33 |
|  | S6 | 92.5 | 1.13 |  |  |
| Fourth Lens (L4) | S7 | −40.9 | 3.03 | 1.785 | 25.68 |
|  | S8 | 14.6 | 1.07 |  |  |
| Fifth Lens (L5) | S9 | 98.9 | 5.77 | 1.639 | 55.38 |
|  | S10 | −17.7 | D2 (variable) |  |  |

In the abovementioned configuration, the focal length F1 of the first lens group 110 is equal to −47.989 mm, and the focal length F2 of the second lens group 120 is equal to 27.788 mm.

TABLE 5

|  | Wide-end | Tele-end |
| --- | --- | --- |
| D1 (mm) | 40.154 | 32.950 |
| D2 (mm) | 19.934 | 21.659 |
| EFL (mm) | 21.353 | 24.138 |
| F-number | 2.409 | 2.558 |

As shown in Table 5, D1 is the distance between the first lens group 110 and the second lens group 120, and D2 is the distance between the second lens group 120 and the image processing unit IPU. the F-number of the zoom lens 100 is smaller than 3.5, namely the aperture of the zoom lens 100 is large and the relative aperture is large. In addition, effect of eliminating image aberration is achieved by only five spherical lenses in the embodiment. In other words, the zoom lens 100 may have the advantages of low manufacturing cost and simplified lens structure.

In light of the foregoing, the embodiments of the disclosure include at least the following advantages. In the abovementioned embodiments of the disclosure, the zoom lens is configured as the surface of the first lens which is nearer the object side is designed as a plane or a substantial plane, so as to prevent dust accumulating on that surface, and reduce the possibility that the light beam transmitted to that surface is reflected back to the image processing unit. Therefore, the zoom lens of the disclosure can improve the negative impact of the dust accumulating and cross-talk to the imaging quality.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the advantages or features disclosed by the present invention. Moreover, the abstract and the headings are merely used to aid in searches of patent files and are not intended to limit the scope of the claims of the present invention. In addition, the terms "first", "second" and the like used in the specification or claims are merely for naming the elements or distinguishing between different embodiments or scopes, whereas the quantity of the elements is not limited thereby.

What is claimed is:

1. A zoom lens, comprising:
   a first lens group, having a negative refractive power, wherein the first lens group is disposed between an object side and an image side and includes a first lens, and the first lens has a negative refractive power; and
   a second lens group, having a positive refractive power, wherein the second lens group is disposed between the first lens group and the image side and includes a second lens, a third lens, a fourth lens and a fifth lens sequentially arranged from the object side to the image side, refractive powers of the second lens, the third lens, the fourth lens and the fifth lens are positive, positive, negative and positive sequentially, wherein the first lens has a surface facing the object side, and a radius of curvature of the surface facing the object side is R1, and $|R1|>700$ mm.

2. The zoom lens as claimed in claim 1, wherein $|R1|>1000$ mm.

3. The zoom lens as claimed in claim 1, wherein the surface facing the object side of the first lens is a plane, and $|R1|=\infty$.

4. The zoom lens as claimed in claim 1, wherein the first lens has a surface facing the second lens group, a radius of curvature of the surface facing the second lens group is R2, and $35<|R1/R2|<\infty$.

5. The zoom lens as claimed in claim 1, wherein a focal length of the first lens group is F1, a focal length of the second lens group is F2, and $1.651<|F1/F2|<1.85$.

6. The zoom lens as claimed in claim 1, wherein an Abbe number of the first lens is $Vd_{L1}$, a focal length of the first lens group is F1, a focal length of the zoom lens is F, and the zoom lens satisfies the following equation: $1.2<|Vd_{L1}/F1|<1.5$, and $2<|F1/F|<2.25$.

7. The zoom lens as claimed in claim 1, further comprising:
   an aperture stop, disposed between the third lens and the fourth lens of the second lens group, or disposed between the fourth lens and the fifth lens of the second lens group.

8. The zoom lens as claimed in claim 1, wherein the fourth lens has a surface facing the third lens, a radius of curvature of the surface facing the third lens is R3, the fourth lens has a surface facing the fifth lens, a radius of curvature of the surface facing the fifth lens is R4, a refractive index of the fourth lens is $N_{L4}$, and the fourth lens satisfies the following equation: $4<|(R3/R4)*N_{L4}|<5.1$.

9. The zoom lens as claimed in claim 1, wherein an average refractive index of the second lens group is larger than 1.65.

10. The zoom lens as claimed in claim 1, wherein each of the first lens, the second lens, the third lens, the fourth lens and the fifth lens is a spherical lens.

11. The zoom lens as claimed in claim 1, wherein the first lens group and the second lens group are adapted to move between the object side and the image side, so that the zoom lens is switched between a wide-end and a tele-end.

12. The zoom lens as claimed in claim 11, wherein when the first lens group and the second lens group move away from each other, the zoom lens is switched from the tele-end to the wide-end.

13. The zoom lens as claimed in claim 11, wherein when the first lens group and the second lens group move toward each other, the zoom lens is switched from the wide-end to the tele-end.

14. The zoom lens as claimed in claim 1, wherein the second lens is a biconvex lens, the third lens is a convex-concave lens with a convex surface facing the second lens, the fourth lens is a biconcave lens and the fifth lens is a biconvex lens.

* * * * *